Jan. 14, 1964  A. D. BAILEY  3,118,141
RADIO DIRECTION FINDING SYSTEM
Filed Dec. 27, 1961  5 Sheets-Sheet 1

INVENTOR,
ALBERT DAVID BAILEY.
BY Jack H. Linscott
ATTORNEY.

Jan. 14, 1964     A. D. BAILEY     3,118,141

RADIO DIRECTION FINDING SYSTEM

Filed Dec. 27, 1961     5 Sheets-Sheet 2

INVENTOR,
ALBERT DAVID BAILEY.
BY Jack H. Linscott
ATTORNEY.

Jan. 14, 1964  A. D. BAILEY  3,118,141
RADIO DIRECTION FINDING SYSTEM
Filed Dec. 27, 1961  5 Sheets-Sheet 3

RDF BEARING INDICATOR

WATSON-WATT DISPLAY

INVENTOR,
ALBERT DAVID BAILEY
BY Jack H. Linscott

ATTORNEY.

Jan. 14, 1964     A. D. BAILEY     3,118,141
RADIO DIRECTION FINDING SYSTEM
Filed Dec. 27, 1961     5 Sheets-Sheet 4

INVENTOR,
ALBERT DAVID BAILEY.
BY Jack H. Linscott

ATTORNEY

INVENTOR.
ALBERT DAVID BAILEY.
BY Jack H. Linscott
ATTORNEY.

3,118,141
RADIO DIRECTION FINDING SYSTEM
Albert David Bailey, Champaign, Ill., assignor to the United States of America as represented by the Secretary of the Army
Filed Dec. 27, 1961, Ser. No. 162,613
7 Claims. (Cl. 343—113)

The invention relates in general to radio direction finders and more particularly to radio direction finders utilizing radio interferometer techniques.

The purpose of the invention is to provide a radio direction finding system utilizing radio interferometer techniques that will permit one to obtain the direction of arrival of a radio signal with an accuracy that is considerably better than that obtained with the conventional small aperture radio direction finding systems, e.g., the crossed-adcock spinning radio goniometer type system.

The invention comprises radio direction finding means utilizing radio interferometer techniques for displaying on the face of a cathode ray tube bearing data of a radio signal. The interferometer bearing data display will be a multivalued function of frequency, azimuth, and elevation angle of arrival of the radio signal. In order to evaluate the interferometer bearing data display, calibrating means are provided for generating a cursor on the face of the cathode ray tube that may be made to coincide with the line of indicated bearing as determined from the interferometer bearing data display. The cursor is generated by calibrating means from frequency, azimuth, and elevation angle of arrival data produced by conventional equipment. When the cursor does not coincide with the interferometer bearing data display the azimuth input to the calibrating means can be varied until they do coincide. The azimuth input is then an accurate indication of the azimuth of the radio signal.

There are two embodiments of the invention disclosed in this application. In one embodiment a single interferometer bearing data display and a single cursor are generated on the face of a cathode ray tube. This embodiment is disclosed as FIGURES 1, 2 and 3. In the other embodiment three interferometer bearing displays and three cursors are generated on the face of a single cathode ray tube, or alternatively on three separate cathode ray tubes. Each of three interferometer bearing data displays is generated from an interferometer pair which is spaced 120 degrees from each of the other two interferometer pairs. This embodiment is disclosed as FIGURES 4–17.

An object of the invention is to provide a radio direction finding system that will permit one to obtain the direction of arrival of a radio wave with an accuracy that is considerably better than that obtained with conventional small aperture radio direction finding systems, e.g., the crossed-adcock spinning radio goniometer type system.

Another object of the invention is to provide a radio direction finding system which is considerably less affected by polarization, site, and multipath wave interference error producing phenomena than are conventional small aperture radio direction finding systems.

Another object of the invention is to provide a radio direction finding system which employs radio interferometer techniques to gain a significant improvement in accuracy.

Another object of the invention is to provide a radio direction finding system employing sum-and-difference radio interferometer techniques together with means for calibrating the indicated data of the incoming radio signal by utilizing an accurate estimate of the bearing and elevation angle-of-arrival of the incoming radio signal.

Another object of the invention is to provide a radio direction finding system employing radio interferometer techniques together with a conventional small aperture radio direction finder to resolve the ambiguities that naturally arise in radio interferometer techniques.

Other objects and a fuller understanding of the invention may be had by referring to the following description and claims, taken in conjunction with the accompanying drawings, in which:

Figure 4:
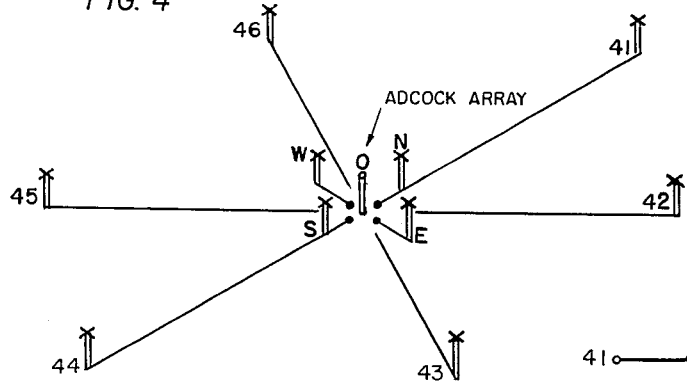
FIGURE 4 shows the antenna system used in the invention when three interferometer bearing data displays and three cursors are generated on the face of a cathode ray tube.
Figure 11:
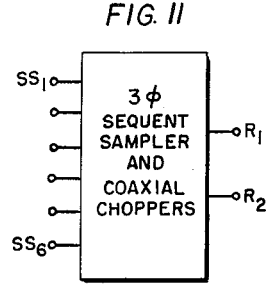
FIGURE 11 shows a $3\phi$ sequential sampler and coaxial choppers for sequentially sampling the voltages from the three interferometer pairs in FIGURE 4.
Figure 12:
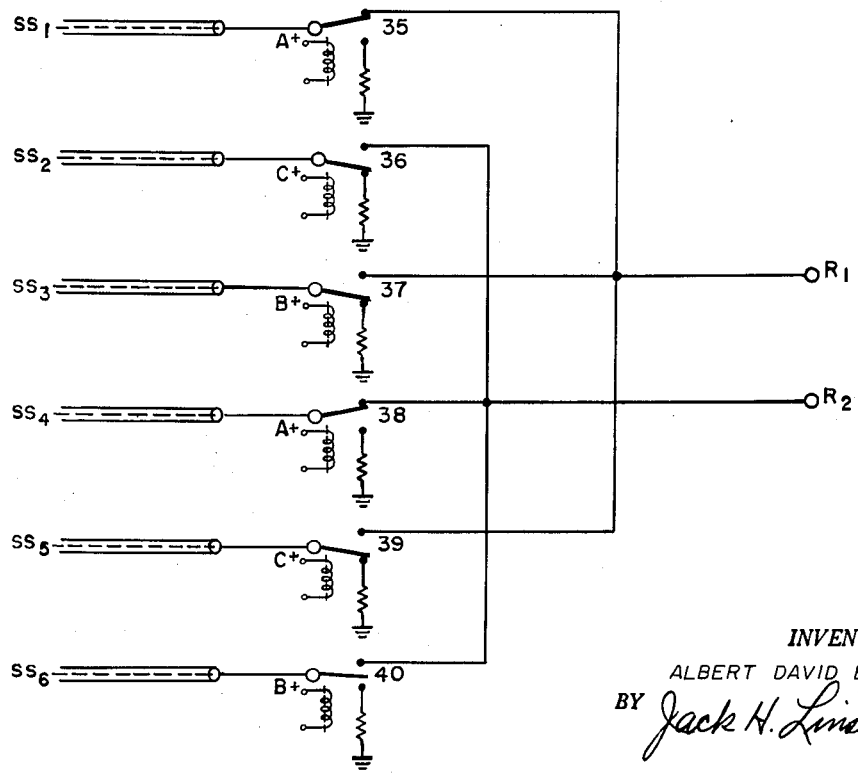
Figure 14:
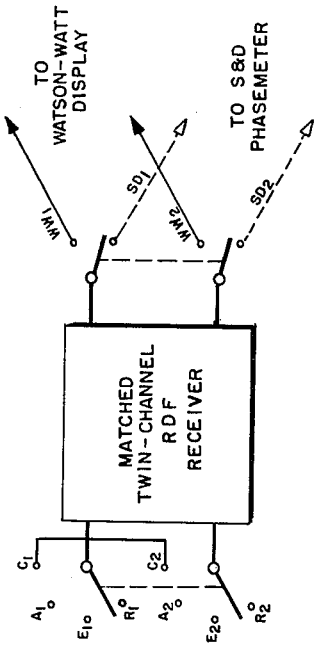
Figure 13:
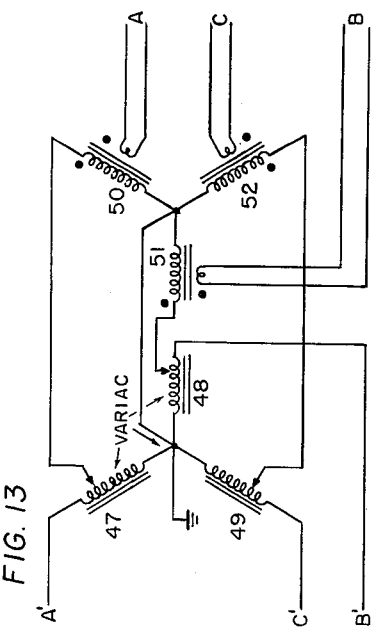
Figure 15:
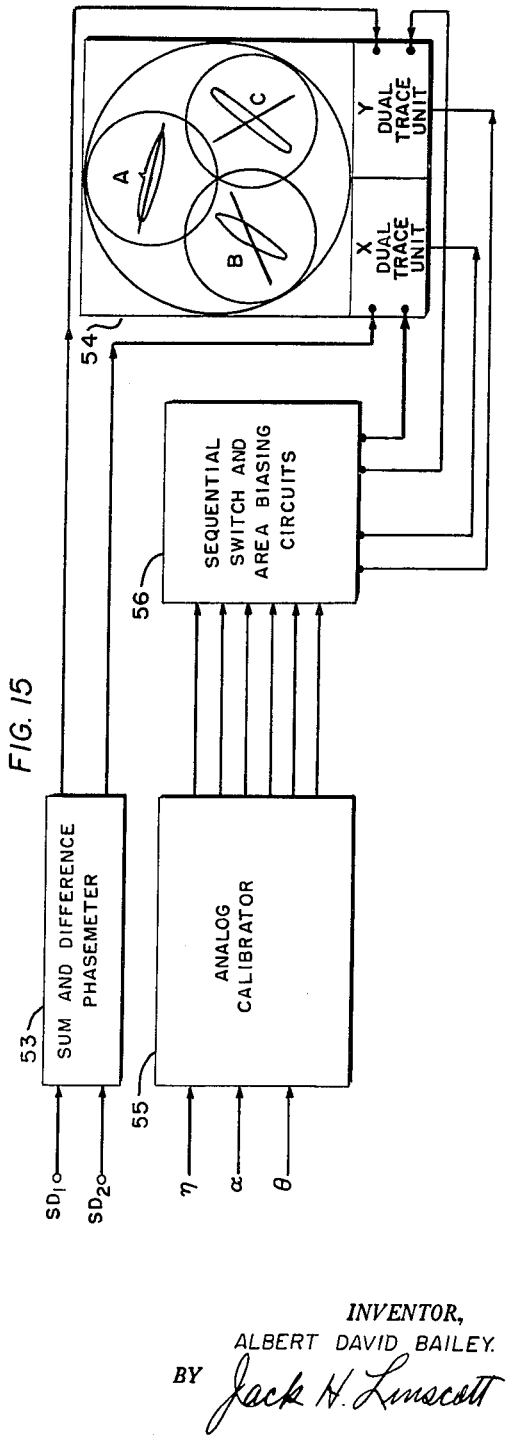
Figure 16:
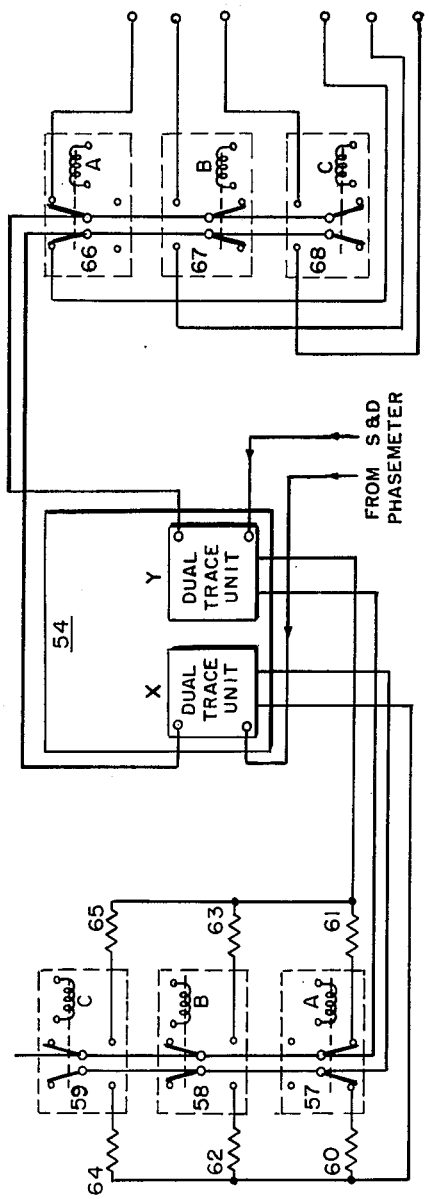
Figure 17:
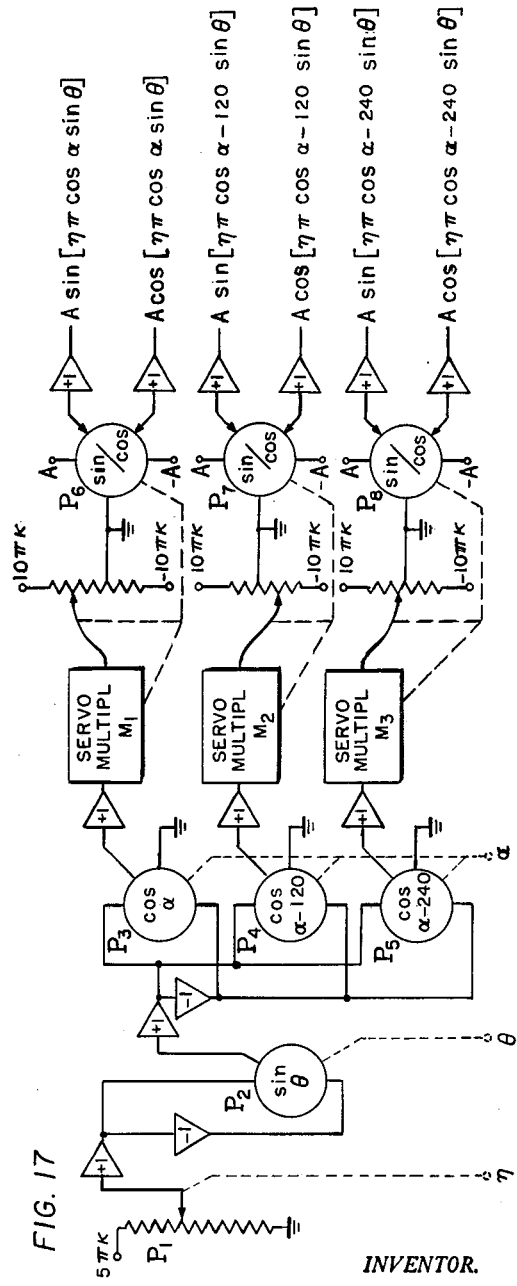

FIGURES 12 and 13 disclose the circuitry used in FIGURE 11;

FIGURE 14 shows a matched twin-channel RDF receiver with the input and output switches used in the invention;

FIGURE 15 shows a block diagram for the processing of data from the antenna system in FIGURE 4;

FIGURE 16 shows the circuitry of the sequential switch and area biasing circuits 56 in FIGURE 15 and how the circuits are connected to the cathode ray tube 54;

FIGURE 17 shows the analog calibrator 55 used in the block diagram of FIGURE 15.

Figure 1:
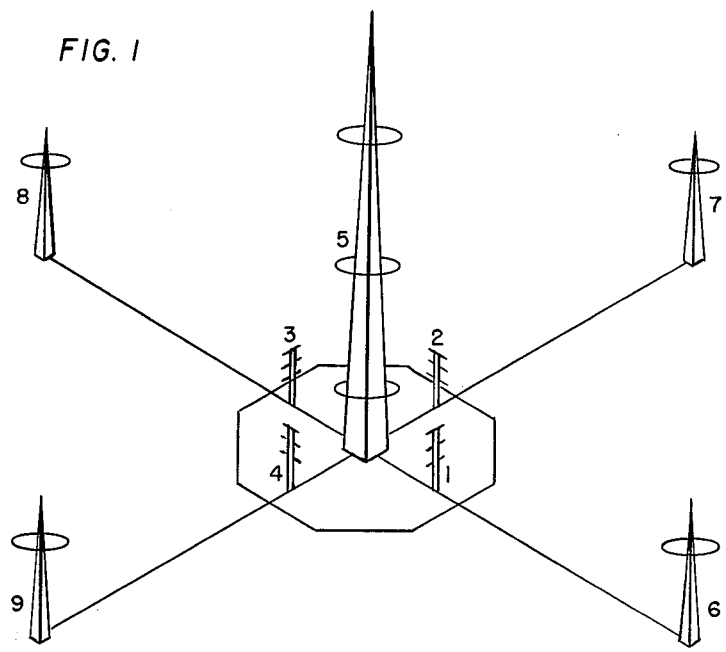
FIGURE 1 shows the antenna system used in the invention when a single interferometer bearing data display and a single cursor are generated on the face of a cathode ray tube.

Referring to FIGURE 1, antennas 1, 2, 3 and 4 make up a crossed-adcock antenna system. A vertical mast 5 is placed at the center of the system on which is stacked at appropriate spacings a number of directional antennas and interconnecting cables which will provide data for determining the elevation angle of arrival of the signal. The so-called "sense" and/or intercept antenna may be placed at the top of the mast 5. Antennas 6, 7, 8 and 9 are two pairs of isotropic antennas. Antennas 6 and 8 are separated by several wavelengths along a reference base line running through antennas 1 and 3. Antennas 6 and 8 constitute an E-W interferometer pair. Antennas 7 and 9 are separated by several wavelengths along a reference base line running through antennas 2 and 4. Antennas 7 and 9 constitute a N-S interferometer pair. Each interferometer pair effectively covers two 90° sectors centered about the line normal to the plane containing the interferometer pair. Thus if the N-S interferometer pair were used, its effective sectors would be 90°

±45° and 270° ±45°. The E-W interferometer pair will cover the other two sectors.

Figure 2:
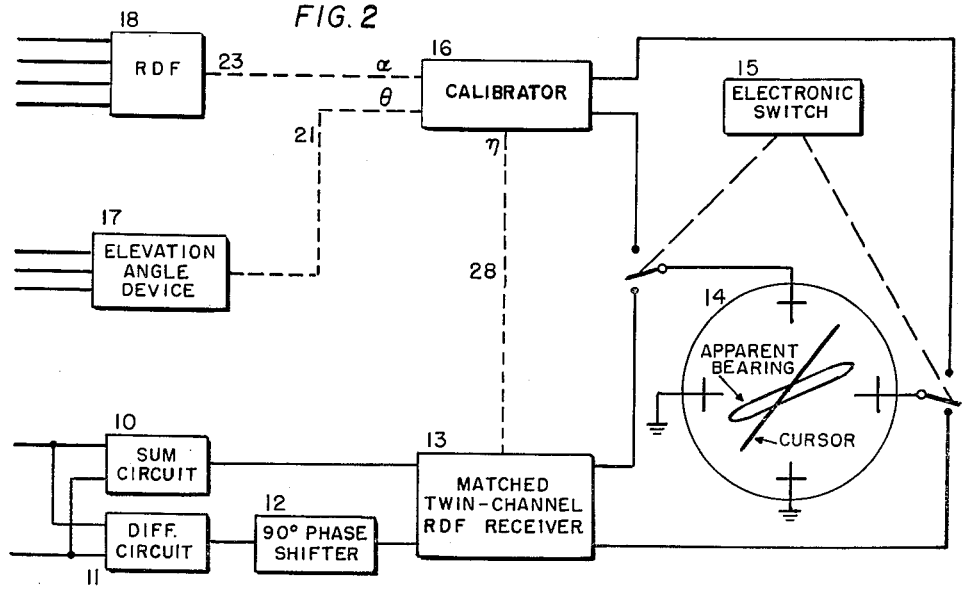
FIGURE 2 shows a block diagram for the processing of data from the antenna system of FIGURE 1.

Referring to FIGURE 2 the sum circuit 10 and the difference circuit 11 each receives the outputs from either the N-S or the E-W interferometer pair. A switch can be located between the antennas 6, 7, 8 and 9 and summing and difference circuits 10 and 11 for selecting the interferometer pair desired. The output of difference circuit 11 is applied to the 90° phase shifter 12. Summing circuits, difference circuits and phase shifting circuits are well-known; therefore, the details of these circuits are not disclosed in this application. The voltage output of summing circuit 10 is proportional to $A \cos (n\pi \cos \alpha \sin \theta)$ and the voltage output of 90° phase shifter 12 is proportional to $A \sin (n\pi \cos \alpha \sin \theta)$, where $A$ is a constant, "$n$" is the number of wavelengths of separation between the elements in the antenna pair, "$\theta$" is the elevation angle of arrival of the radio signal and "$\alpha$" is the bearing or azimuthal angle-of-arrival of the radio signal. The outputs of summing circuit 10 and 90° phase shifter 12 are applied to the two inputs of matched twin channel RDF receiver 13. Twin-channel receivers are well-known; therefore the details are not disclosed in this application. The two outputs of receiver 13 are applied to the vertical and horizontal deflection plates of cathode ray tube 14 through electronic switch 15. The electronic switch 15 can take any form as long as it alternatively connects the outputs of receiver 13 and the outputs of calibrator 16. The frequency of the switch 15 must be great enough so that the outputs of the receiver 13 and the calibrator 16 will continuously appear on the face of the cathode ray tube 14. Instead of using receiver 13 and cathode ray tube 14 to display the two outputs from summing circuit 10 and 90° phase shifter 12 a spinning radio goniometer and associated cathode ray indicator, i.e., the ABI or automatic bearing indicator system could be used. A pattern will appear on the face of the cathode ray tube 14 which is designated apparent bearing. The angular aspect or tilt of the pattern has a correspondence to the direction of arrival of the radio signal. The interferometer bearing data display will be a multivalued function of frequency, azimuth and elevation angle of arrival. In order to make some sense of the bearing data display a calibrator 16 is used to generate a cursor that can be made to coincide with the apparent bearing line on the face of the cathode ray tube 14.

The RDF 18 is a crossed-adcock radio direction finder which is connected to antennas 1, 2, 3 and 4 of FIGURE 1. Other small aperture radio direction finders could also be used. The important consideration is that the small aperture radio direction finder be capable of giving an estimate of the bearing to an accuracy that the bearing ambiguities of the interferometer are resolved, that is, to such an accuracy that one knows which lobes of the sum-and-difference interferometer technique are pertinent in a given instance. As an example, suppose the small aperture direction finder bearing has a standard deviation of 4 degrees. Assuming a normal distribution of bearing deviations, we know that it is almost certain that any indicated bearing lies in a sector of ±3 sigma, centered on the indicated means i.e., ±12° of the indicated bearing. Thus if our interferometer technique has an effective aperture such that its smallest lobe is not less than 24° the ambiguities may be resolved. The calibrator 16 then permits one to obtain a fine estimate of the bearing by interpolating within the sector. It has been pointed out that the N-S interferometer pair covers certain sectors and the E-W interferometer pair covers other sectors. The coarse estimate of the azimuthal angle of arrival "$\alpha$" obtained by RDF 18 permits a selection of the more accurate interferometer pair. The coarse estimate of "$\alpha$" is applied to calibrator 16. The structure of calibrator 16 will be disclosed later. The elevation angle of arrival "$\theta$" is found from data supplied from elevation angle of arrival antennas which are located on mast 5 of FIGURE 1. The data is supplied from the antennas to elevation angle device 17. Device 17 generates an output which is proportional to the elevation angle-of-arrival of the radio signal. See A. F. Wilkins and C. F. Minnis "Arrival Angle of H.F. Waves," Wireless Engineer, February 1956, pp. 47–53 for a system for determining the elevation angle of arrival of a radio signal. Such a system or any system which produces an output proportional to the elevation angle of arrival of the radio signal can be used as the elevation angle device 17. The output of elevation angle device 17 is applied to calibrator 16.

The calibrator 16 is a computing device which will receive data representing azimuthal angle of arrival "$\alpha$," elevation angle of arrival "$\theta$," and the number "$n$" of wavelengths of separation between the elements in the antenna pair and produce the two outputs $$A \cos (n\pi \cos \alpha \sin \theta)$$

and $$A \sin (n\pi \cos \alpha \sin \theta)$$

Figure 3:
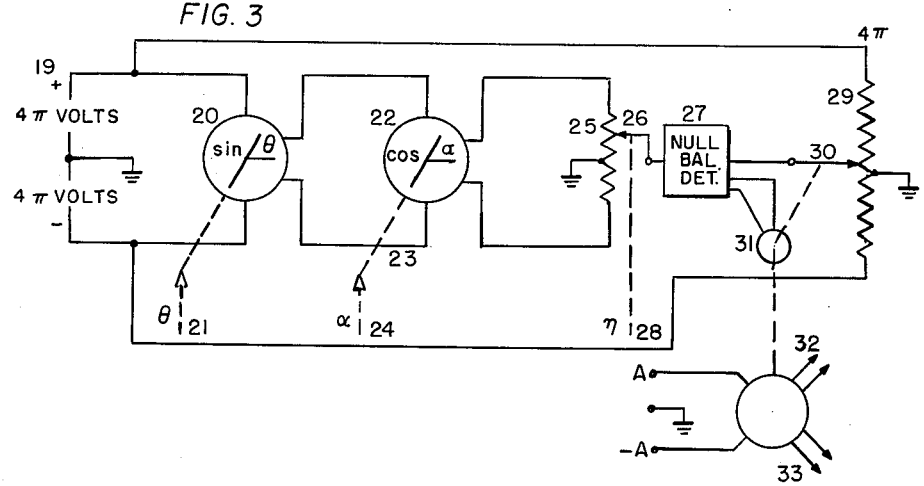
FIGURE 3 shows a block diagram of the calibrator used in the block diagram of FIGURE 2.

Well known analog computing elements can be programmed to perform the function required of calibrator 16. FIGURE 3 discloses a computer which would be suitable to use as calibrator 16. Voltage source 19 applies $4\pi$ and $-4\pi$ volts to sin potentiometer 20. The control arm 21 of sin potentiometer 20 is connected to the output of elevation angle device 17. The outputs of sin potentiometer 20 are connected to the cosine potentiometer 22. The control arm 23 of cosine potentiometer 22 is connected to the output of RDF 18. Since the control arms 21 and 23 of the calibrator require mechanical inputs it is necessary that elevation angle device 17 RDF 18 have mechanical outputs. If elevation angle device 17 and RDF 18 produce electrical outputs they can be converted to mechanical output by means of servomechanisms. Also, a calibrating means which requires electrical inputs could be used. An additional means 24 is provided for turning control arm 23 by hand. The two outputs of cosine potentiometer 22 which are proportional to $\pm 4\pi \cos \alpha \sin \theta$ are applied to linear potentiometer 25 which has its center grounded. The slider 26 of potentiometer 25 is mechanically connected to the tuning knob of matched twin channel RDF receiver 13 by control arm 28. The position of slider 26 is proportional to "$n$" since "$n$" is a linear function of frequency. Voltage source 19 is connected across linear potentiometer 29 which has its center grounded. Slider 30 of potentiometer 29 is electrically connected to the null balance detector 27. The output of the null balance detector 27 is connected to the two phase induction motor 31 the output shaft of which is connected to slider 30 and the control arm 32 of sine-cosine potentiometer 33. A servomechanism device can be used in place of null balance detector 27 and motor 31. When the voltages at sliders 26 and 30 are different null balance detector 27 produces an output voltage which will cause motor 31 to position slider 30 such that the voltages at sliders 26 and 30 are the same. The position of control arm 32 is then proportional to $n\pi \cos \alpha \sin \theta$. Voltages proportional to $\pm A$ are applied to the sine-cosine potentiometer 33. $A$ is time varying and is proportional to $$\frac{1+\sin wt}{2}$$

where $w$ is a low angular velocity in the neighborhood of 100 radians per second. The purpose of having A time varying is to generate a radial line display for the cursor. The outputs of sine-cosine potentiometer 33 are proportional to $A \cos (n\pi \cos \alpha \sin \theta)$ and $A \sin (n\pi \cos \alpha \sin \theta)$. These two voltages are applied through electronic switch 15 to the vertical and horizontal deflection plates of cathode ray tubes 14 which causes the cursor to appear on the face of the tube.

Referring to FIGURES 1 and 2 the operation of the invention will be described. Voltages from either the antenna pair 6 and 8 or the antenna pair 7 and 9 are applied to the sum circuit 10 and difference circuit 11. Receiver 13 is tuned to the desired frequency by a tuning dial. Since "n" is proportional to the fixed physical spacing of the antennas and frequency the position of the tuning dial is proportional to "n." The tuning dial is mechanically connected to control arm 28 which controls the "n" which is applied to calibrator 16. The output of receiver 13 is applied to the deflection plates of cathode ray tube 14 which causes the apparent bearing to appear on the face of tube 14. The apparent bearing which appears will be a multivalued function of frequency, azimuth, and elevation angle of arrival. In order to make some sense out of the apparent bearing the calibrator 16 and associated devices are provided. "α," "θ" and "n" are supplied to the calibrator 16 by RDF 18, elevation angle device 17 and the tuning dial of receiver 13, respectively. The outputs of calibrator 16 are applied to the deflection plates of cathode ray tube 14 which causes the cursor to appear on the face of tube 14. The cursor will probably not coincide with the apparent bearing. Hand operated means 24 is then used to turn control arm 23 until the cursor coincides with the apparent bearing. The position of control arm 23 is then an accurate indication of "α." An indicating scale can be used in conjunction with control arm 23 to give a visual indication of "α."

Figure 5:
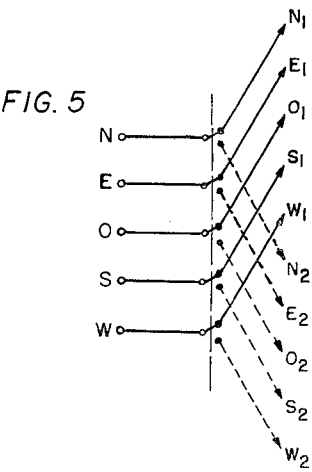
FIGURE 5 shows a switch for selectively connecting the adcock array in FIGURE 4 to the RDF bearing indictor in FIGURE 7 or the balun in FIGURE 9.
Figure 6:
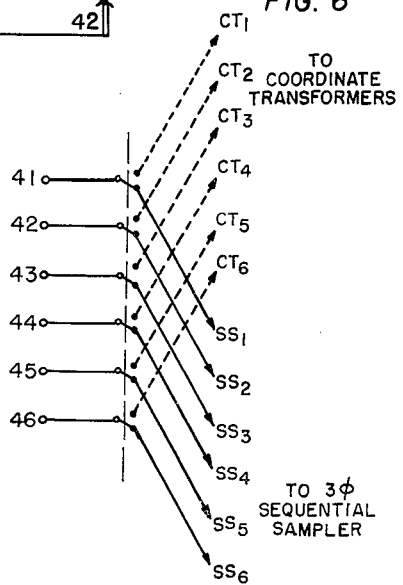
FIGURE 6 shows a switch for selectively connecting the antennas 41–46 in FIGURE 4 to coordinate transformers in FIGURE 10 or the $3\phi$ sequential sampler and coaxial choppers in FIGURE 11.
Figure 7:
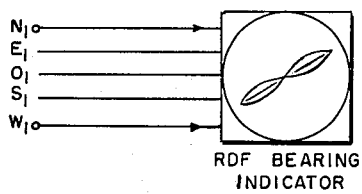
FIGURE 7 shows a conventionual RDF bearing indicator which is used to obtain an estimate of the bearing of an incoming radio signal.

FIGURE 4 discloses an antenna array used in a six-element triple-interferometer RDF system. The six antennas 41, 42, 43, 44, 45 and 46 are located sixty degrees apart. Antennas 41 and 44; 42 and 45; and 43 and 46 form three interferometer pairs. Antennas E, W, N, S and O form an adcock array. The switch in FIGURE 5 is used to selectively connect the adcock array to the bearing indicator in FIGURE 7 or the balun in FIGURE 9. The bearing indicator in FIGURE 7 is used to get an estimate of the bearing angle "α" of an incoming radio signal. This estimate of bearing angle "α" is applied to one of the inputs of analog calibrator 55 in FIGURE 15. The balun is used to transform from a balanced input to an unbalanced output. This technique is well known and will not be disclosed in this application. The switch in FIGURE 6 is used to selectively connect the interferometer antenna pairs to the coordinate transformers in FIGURE 10, or the 3φ sequential sampler and coaxial choppers in FIGURE 11. The purpose of the coordinate transformers is to provide a voltage transformation from six-phase to two-phase in the sense that the electrical engineer uses the term. This technique is well known and will not be disclosed in this application. The purpose of the 3φ sequential sampler and coaxial choppers is to sequentially sample the voltages from the three interferometer pairs. The circuits that make up the 3φ sequential sampler and coaxial choppers are shown by FIGURES 12 and 13.

Referring to FIGURE 12, there is shown a circuit for sequentially sampling the voltages from the three interferometer pairs. The switches 35, 36, 37, 38, 39 and 40 are each controlled by a coil. Each coil is shown as having a voltage of either A, B or C applied to it. During one interval of time of each cycle the voltage A is such that switches 35 and 38 are closed connecting antenna 41 to terminal $R_1$ and antenna 44 to terminal $R_2$. During this first interval of time switches 36, 37, 39 and 40 connect the other antennas to ground. During the second interval of time voltage B is such that switches 37 and 30 are closed connecting antenna 43 to terminal $R_1$ and antenna 46 to terminal $R_2$. During the second interval of time switches 35, 36, 38 and 39 connect the other antennas to ground. During the third interval of time the voltage C is such that switches 36 and 39 are closed connecting antenna 42 to terminal $R_2$ and antenna 45 to terminal $R_1$. During the third interval of time switches 35, 37, 38 and 40 connect the other antennas to ground. The voltages A, B and C are applied by the circuit in FIGURE 13. A three phase voltage $A^1$, $B^1$, $C^1$ is applied to the three variacs 47, 48 and 49. The brushes of variacs 47, 48 and 49 are connected to the primary windings of transformers 50, 51 and 52. The voltages A, B and C are taken from the secondary windings of transformers 50, 51 and 52, and applied to the coils of switches 35–40 in FIGURE 12.

Figure 8:
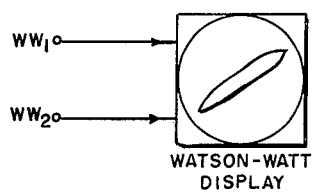
FIGURE 8 shows traditional Watson-Watt display.
Figure 9:
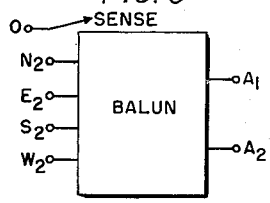
FIGURE 9 shows balun which is used to transform from a balanced input to an unbalanced output.
Figure 10:
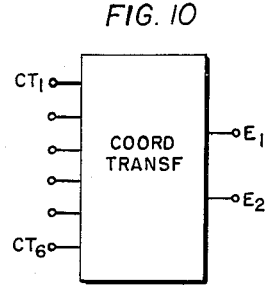
FIGURE 10 shows a coordinate transformer which is used to provide a voltage transformation from six-phase to two-phase.

Referring to FIGURE 14, there is shown a matched twin-channel RDF receiver with a four position switch connected to its input and a two position switch connected to its output. When the input switch is in its first position terminals $C_1$ and $C_2$, which are used for alignment purposes, are connected to the receiver. When the input switch is in its second position the balun of FIGURE 9 is connected to the receiver. When the input switch is in its third position the coordinate transformer of FIGURE 10 is connected to the receiver. When the input switch is in its fourth position the 3φ sequential sampler and coaxial choppers of FIGURE 11 is connected to the receiver. When the output switch is in its first position the receiver is connected to a traditional Watson-Watt display shown in FIGURE 8. When the output switch is in its second position the receiver is connected to the sum and difference phasemeter 53 in FIGURE 15.

Referring to FIGURE 15, there is shown a sum and difference phasemeter 53 to which the voltages from the three interferometer pairs are sequentially applied. The phasemeter 53 could alternatively be the summing circuit 10, the difference circuit 11 and the 90° phase shifter of FIGURE 2. The outputs of the phasemeter are a sum voltage and a difference voltage. The sum voltage is proportional to $A \cos(n\pi \cos \alpha \sin \theta)$ and the difference voltage is proportional to $A \sin(n\pi \cos \alpha \sin \theta)$ where the symbols represent the same things as the symbols used in describing FIGURE 2. The sum and difference voltages are applied to the two dual trace units of X—Y oscilloscope 54. The oscilloscope that is being used is Tektronix 536 which is made by Tektronix Company. The analog calibrator, which is fully disclosed in FIGURE 17, receives the three inputs "n," "α" and "θ" and produces six outputs which are proportional to $A \sin(n\pi \cos \alpha \sin \theta)$; $A \cos(n\pi \cos \alpha \sin \theta)$; $A \sin(n\pi \cos(\alpha-120) \sin \theta)$; $A \cos(n\pi \cos(\alpha-120) \sin \theta)$; $A \sin(n\pi \cos(\alpha-240) \sin \theta)$; $A \cos(n\pi \cos(\alpha-240) \sin \theta)$. These six outputs are applied to the sequential switch and area biasing circuits 56, which is fully disclosed in FIGURE 16. The four outputs of circuits 56 consist of a selected two outputs from the calibrator 55 and a selected two area biasing resistances. The two selected outputs from the calibrator 55 correspond to the two outputs from the sum and difference phasemeter 53. One dual trace unit of oscilloscope 54 switches between the "X" voltage output of the sum and difference phasemeter and the corresponding "X" voltage generated by the analog calibrator. The other dual trace unit switches synchronously in one-to-one correspondence between the "Y" voltage output of the sum-and-difference phasemeter and the corresponding "Y" voltage generated by the analog calibrator. The synchronous switching of the two dual trace units should be at least 600 c.p.s. Techniques for doing this are well known and are not disclosed in this application. The selected two area biasing resistances determine the position on the screen of the oscilloscope that the picture will appear.

Referring to FIGURE 16, there is shown the sequential switch and area biasing circuits 56 of FIGURE 15. The voltages A, B and C supplied by the circuit of FIGURE 13 are applied to switches 57, 58 and 59 so that the resistance pairs 60, 61; 62, 63; and 64, 65 are sequentially applied to the "X" and "Y" dual trace units of oscilloscope 54. The resistances 60, 61, 62, 63, 64 and 65 are switched in shunt with resistances internal of the oscilloscope for the purpose of controlling the centering of the beam. The resistances are appropriate magnitudes (predetermined by experiment) to center the beam at three separate locations on the face of the oscilloscope. This operation is what is meant by "area biasing." The voltages A, B and C are applied to switches 66, 67 and 68 so that the three voltages pairs from analog calibrator 55 are sequentially applied to the "X" and "Y" dual trace units of oscilloscope 54.

Referring to FIGURE 17, there is shown the analog calibrator used. A voltage proportional to $5\pi K$ is applied to potentiometer $P_1$ the slider of which is controlled by a mechanical movement proportional to "$n$." The output of potentiometer $P_1$ is applied to sin potentiometer $P_2$ the control arm of which is controlled by a mechanical movement proportional to "$n$." The output of potentiometer $P_2$ is applied to cos potentiometers $P_3$, $P_4$ and $P_5$ with their control arms separated by 120° and controlled in unison by a mechanical movement proportional to "$\alpha$." The outputs of $P_3$, $P_4$ and $P_5$ are applied to servo multipliers $M_1$, $M_2$ and $M_3$ the mechanical outputs of which control the control arms of sin-cos potentiometers $P_6$, $P_7$ and $P_8$. The outputs of sin-cos potentiometers $P_6$, $P_7$ and $P_8$ are proportional to $A \sin [n\pi \cos \alpha \sin \theta]$; $A \cos [n\pi \cos \alpha \sin \theta]$; $A \sin [n\pi \cos (\alpha-120) \sin \theta]$; $A \cos [n\pi \cos (\alpha-120) \sin \theta]$; $A \sin [n\pi \cos (\alpha-240) \sin \theta]$; and $A \cos [n\pi \cos (\alpha-240) \sin \theta]$.

The operation of the six-element triple-interferometer RDF system will be described with reference to FIGURES 4–17. A radio signal received by the adcock array in FIGURE 4 will be applied to the switch disclosed by FIGURE 5. When the switch is in its upper position the adcock array will be connected to the RDF bearing indicator shown by FIGURE 7. This bearing indication can be used as an estimated "$\alpha$" input to the analog calibrator 55 in FIGURE 15. When the switch in FIGURE 5 is in its lower position the adcock array is connected to the balun in FIGURE 9 and the input switch of the receiver in FIGURE 14 is switched to its $A_1$ and $A_2$ terminals and the output of the receiver is switched to the Watson Watt Display shown by FIGURE 8. A radio signal received by the six antennas 41–46 of FIGURE 4 will be applied to the switch in FIGURE 6. When the switch is in its upper position the antennas are connected to the co-ordinate transformers of FIGURE 10, the input switch to the receiver in FIGURE 14 is switched to terminals $E_1$ and $E_2$, and the output switch of the receiver is switched to its upper position. The antennas will then be connected to the Watson-Watt Display in FIGURE 8. When the switch in FIGURE 6 is in its lower position the antennas 41–46 are connected to the 3$\phi$ sequential sampler and coaxial choppers in FIGURE 11. During the first, second and third intervals of each cycle antenna pairs 41, 44; 42, 45; and 43, 46 are applied to the sum and difference phasemeter 63 of FIGURE 15. The outputs of the phasemeter during the first interval of time will be $A \sin [n\pi \cos \alpha \sin \theta]$, $A \cos [n\pi \cos \alpha \sin \theta]$; during the second interval of time the outputs will be $A \sin [n\pi \cos (\alpha-120) \sin \theta]$, $A \cos [n\pi \cos (\alpha-120) \sin \theta]$; and during the third interval of time the outputs will be $A \sin [n\pi \cos (\alpha-240) \sin \theta]$, $A \cos [n\pi \cos (\alpha-240) \sin \theta]$. These voltages and the voltages generated by analog calibrator 55 are applied to the oscilloscope 54 which respectively cause the three apparent bearing displays and the three cursor displays. The "$\alpha$" input to analog calibrator 55 is then varied until the three cursors coincide with the three apparent bearings, as nearly as possible. The "$\alpha$" input is then an accurate indication of the bearing of the incoming radio signal.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A radio direction finding system for obtaining the direction of arrival of a radio signal with an accuracy that is considerably better than that obtained with conventional small aperture radio direction finding systems comprising means utilizing radio interferometer techniques for displaying on the face of a cathode ray tube an apparent bearing indication which is a multi-valued function of frequency, azimuth and elevation angle of arrival of the radio signal, conventional radio direction finding means for producing an output which is approximately proportional to the azimuth of the radio signal, means for producing an output proportional to the elevation angle of arrival of the radio signal, means for producing an output proportional to the frequency of the radio signal, means under the control of the said outputs proportional to azimuth, angle-of-arrival and frequency for producing a cursor on the said face of said cathode ray tube, and means for varying said output which is approximately proportional to the azimuth of the radio signal so that the said cursor can be made to coincide with the said apparent bearing indication.

2. A radio direction finding system for obtaining the direction of arrival of a radio signal with an accuracy that is considerably better than that obtained with conventional small aperture radio direction finding systems comprising a pair of isotropic antennas separated by several wavelengths, a voltage summing means for summing the voltage outputs of said pair of antennas to produce a voltage proportional to $$A \cos (n\pi \cos \alpha \sin \theta)$$

Where $A$ is a constant, $n$ is the number of wavelengths of separation between the said pair of antennas, $\theta$ is the elevation angle of arrival of the radio signal (measured from the zenith) and $\alpha$ is the azimuth of the radio signal, a voltage difference and phase shifting means connected to the said pair of antennas to produce a voltage proportional to $$A \sin (n\pi \cos \alpha \sin \theta)$$

a cathode ray tube, electronic switching means for applying the said voltage proportional to $A \cos (n\pi \cos \alpha \sin \theta)$ and $A \sin (n\pi \cos \alpha \sin \theta)$ to the deflection plates of said cathode ray tube for displaying on the face of the cathode ray tube an apparent bearing indication, computing means receiving inputs representative of $n$, $\theta$ and $\alpha$ and producing output voltages proportional to $A \cos (n\pi \cos \alpha \sin \theta)$ and $A \sin (n\pi \cos \alpha \sin \theta)$, electronic switching means for applying the last mentioned voltages proportional $A \cos (n\pi \cos \alpha \sin \theta)$ and $A \sin (n\pi \cos \alpha \sin \theta)$ to the deflection plates of said cathode ray tube for displaying a cursor on the face of the cathode ray tube and means to vary the said input to the computing means representative of $\alpha$ so as to make the said cursor coincide with the said apparent bearing indication, said electronic switching means coupled to the deflection plates of said cathode ray tube whereby said deflection plates are alternately coupled to the output voltages of the summing and difference means and the output voltages of the computing means.

3. A radio direction finding system for obtaining the direction of arrival of a radio signal with an accuracy that is considerably better than that obtained with conventional small aperture radio direction finding systems comprising means for displaying on the face of a cathode ray tube an apparent bearing indication which is a multi-valued function of frequency, azimuth and elevation angle of arrival of the radio signal, means receiving inputs proportional frequency, azimuth and elevation angle of arrival of the radio signal for displaying a cursor on the face of said cathode ray tube and means to vary the said input proportional to azimuth so as to make the said cursor coincide with the said apparent bearing indication.

4. A radio direction finding system for obtaining the direction of arrival of a radio signal comprising a cathode ray tube, means for displaying on the face of said cathode ray tube an apparent bearing indication which is a function of frequency, azimuth and elevation angle of arrival of the radio signal, means for producing outputs proportional to frequency, azimuth and elevation angle of arrival of the radio signal, means receiving said outputs for producing a cursor on the face of said cathode ray tube which is a function of frequency, azimuth and elevation angle of arrival and means for varying the said output proportional to azimuth so as to make the cursor coincide with apparent bearing indication.

5. A radio direction finding system for obtaining the direction of arrival of a radio signal with an accuracy that is considerably better than that obtained with conventional small aperture radio direction finding systems comprising means utilizing radio interferometer techniques for displaying, on three separate areas on the face of a cathode ray tube, three apparent bearing indications which are multivalued functions of frequency, azimuth and elevation angle of arrival of the radio signal, calibrating means having inputs approximately proportional to frequency, azimuth and elevation angle of arrival for producing a cursor on each of the three areas on the face of the cathode ray tube and means for varying the input which is approximately proportional to the azimuth of the radio signal so that the cursors can be made to concide with the apparent bearing indications.

6. A radio direction finding system for obtaining the direction of arrival of a radio signal with an accuracy that is considerably better than that obtained with conventional small aperture radio direction finding systems comprising means for displaying on the face of a cathode ray tube three apparent bearing indications which are multivalued functions of frequency, azimuth and elevation angle of arrival of the radio signal, means receiving inputs proportional to frequency, azimuth ad elevation angle of arrival of the radio signal for displaying three cursors on the face of said cathode ray tube and means to vary the said input proportion to azimuth so as to make the said cursors coincide with the said apparent bearing indications.

7. A radio direction finding system for obtaining the direction of arrival of a radio signal comprising a cathode ray tube, means for displaying on the face of said cathode ray tube a plurality of apparent bearing indications which are functions of frequency, azimuth and elevation angle of arrival of the radio signal, means receiving inputs proportional to frequency, azimuth and elevation angle of arrival of the radio signal for producing a number of cursors equal to said said plurality of apparent bearing indications on the face of said cathode ray tube and means for varying the said input proportional to azimuth so as to make the said cursors coincide with the said apparent bearing indications as nearly as possible.

References Cited in the file of this patent

UNITED STATES PATENTS

| | | |
|---|---|---|
| 3,025,520 | Werner | Mar. 13, 1962 |
| 3,060,427 | Jaffe et al. | Oct. 23, 1962 |